United States Patent
Goto (10) Patent No.: US 9,420,197 B2
(45) Date of Patent: Aug. 16, 2016

(54) IMAGING DEVICE, IMAGING METHOD AND IMAGING PROGRAM

(71) Applicant: Samsung Electronics Co., Ltd., Gyeonggi-do (KR)

(72) Inventor: Shuichi Goto, Yokohama (JP)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 281 days.

(21) Appl. No.: 14/059,861

(22) Filed: Oct. 22, 2013

(65) Prior Publication Data

US 2014/0176759 A1 Jun. 26, 2014

(30) Foreign Application Priority Data

Dec. 26, 2012 (JP) .................................. 2012-283436
Jun. 10, 2013 (KR) ........................ 10-2013-0066178

(51) Int. Cl.
  *H04N 9/73* (2006.01)
  *H04N 5/235* (2006.01)

(52) U.S. Cl.
  CPC ........... *H04N 5/2354* (2013.01); *H04N 5/2351* (2013.01); *H04N 9/735* (2013.01)

(58) Field of Classification Search
  USPC ...................................................... 348/224.1
  See application file for complete search history.

(56) References Cited

U.S. PATENT DOCUMENTS 5,808,681 A 9/1998 Kitajima

FOREIGN PATENT DOCUMENTS

| JP | 2003-284080 A | 10/2003 |
| JP | 3540485 B2 | 7/2004 |
| JP | 2005-269303 A | 9/2005 |
| JP | 2009-60586 A | 3/2009 |
| JP | 2012-85360 A | 4/2012 |

*Primary Examiner* — Roberto Velez
*Assistant Examiner* — Stephen Coleman
(74) *Attorney, Agent, or Firm* — Cha & Reiter, LLC (57) ABSTRACT

An imaging device includes a flash ratio calculator calculating a flash ratio based on a flash image and a non-flash image, a main subject flash ratio selector selecting a flash ratio of an area of a main subject, a preliminary white balance coefficient determination unit determining a preliminary white balance coefficient used in adjusting a white balance, a flash ratio range calculator calculating an upper limit value and a lower limit value of a range of the flash ratio based on the flash ratio of the main subject and the preliminary white balance coefficient, a flash ratio processor altering the flash ratio so that the flash ratio is in the calculated range, and a white balance coefficient calculator calculating a white balance coefficient based on the altered flash ratio.

14 Claims, 5 Drawing Sheets

IMAGING DEVICE, IMAGING METHOD AND IMAGING PROGRAM

CROSS-REFERENCE TO RELATED APPLICATIONS

This application claims priority from Japanese Patent Application No. 2012-283436, filed on Dec. 26, 2012, in the Japanese Patent Office and Korean Patent Application No. 10-2013-0066178, filed on Jun. 10, 2013, in the Korean Intellectual Property Office, the disclosure of which is incorporated herein by reference in its entirety.

FIELD OF THE INVENTION

A system according to the present invention supports adjusting white balance of an image under different conditions including in the presence of flash illumination.

BACKGROUND

Known systems adjust white balance for expressing a white color in an image obtained by imaging under variable lighting conditions, including ambient lighting or camera flash. Differences in a color temperature of a subject due to different light sources are adjusted so that each image naturally expresses a proper color tone adaptively with respect to each light source, by adjusting the white balance. This function is called an auto white balance (AWB) function.

Known systems calculate a final WB coefficient value (hereinafter, final WB coefficient value) in response to a flash ratio representing a contribution of the flash to a pixel luminance value based on a white balance coefficient value (hereinafter, preliminary WB coefficient value) calculated by the AWB function. The known system, obtains a preliminary WB coefficient value of an image for just the ambient light without using the flash (hereinafter, non-flash image). In addition, a preliminary WB coefficient value is obtained for just the flash without the ambient light based on a device specification or a real measured value.

A known system calculates a flash ratio by comparing pixels corresponding to a non-flash image and an image photographed by emitting the flash (hereinafter, flash image). When hand vibration or a change in ambient lighting, for example, occurs, pixel luminance corresponding to the flash image and the non-flash image may vary resulting in an inaccurate flash ratio.

A known system applies a low-pass filter (LPF) to the flash ratio for every pixel including pixels with abnormal flash ratio values due to hand vibration or change in ambient lighting, for example. Thereby, the flash ratio is adjusted to change gradually and rapid changes in the flash ratio over the whole image are suppressed.

A final WB coefficient value is calculated using the gradually adjusting flash ratio corresponding to a contribution of the flash exhibiting smooth change in the final WB coefficient value between pixels. When this final WB coefficient value is used in white balance adjustment, a pixel position disturbance (out of color registration) resulting from use of a flash ratio that changes abruptly between pixels is suppressed. The known system calculates an inaccurate abnormally high or low flash ratio that fails to compensate for abrupt changes in flash ratio resulting in pixel position disturbance in an image. A system according to invention principles addresses these deficiencies and related problems.

SUMMARY

A system according to invention principles provides an imaging device, an imaging method and an imaging program that calculates an optimal final WB coefficient value by limiting an effective range of a flash ratio value in response to image content.

An imaging device comprises an acquisition unit configured to acquire, a flash image obtained using a flash and a non-flash image obtained under ambient lighting without the flash. A flash contribution calculator is configured to calculate a flash contribution indicator representing a contribution of the flash to an individual pixel luminance value of the flash image, based on the flash image and the non-flash image acquired by the acquisition unit. A preliminary white balance coefficient determination unit is configured to determine a preliminary white balance coefficient for the flash and ambient light in order to adjust a white balance. A flash contribution indicator range calculator is configured to calculate an upper limit value and a lower limit value of a range of the flash contribution indicator, based on a local flash contribution indicator and the determined preliminary white balance coefficient. A flash contribution indicator processor is configured to alter a flash contribution indicator value calculated by the flash contribution indicator calculator, so that the flash contribution indicator falls within the calculated range. A white balance coefficient calculator configured to calculate a white balance coefficient for application to the flash image, based on the altered flash contribution indicator.

In a feature of the invention, a local flash contribution selector is configured to select the local flash contribution indicator associated with a partial area of the flash image and the non-flash image, as a local flash contribution indicator wherein the flash contribution indicator range calculator is configured to set the local flash contribution indicator as the upper limit value. Further, in an embodiment, the flash contribution indicator comprises a flash ratio and the flash contribution indicator range calculator is configured to calculate the lower limit value of the flash contribution indicator, based on a value derived in response to the preliminary white balance coefficient for the flash and the preliminary white balance coefficient for the ambient light, wherein the step of deriving the value comprises dividing the preliminary white balance coefficient for the flash by the preliminary white balance coefficient for the ambient light.

In another feature of the invention, an imaging method comprises acquiring a flash image using a flash and a non-flash image under ambient lighting without the flash; calculating a flash ratio representing a contribution of the flash to an individual pixel luminance value of the flash image, based on the acquired flash image and non-flash image; determining a preliminary white balance coefficient for the flash and ambient light in order to adjust a white balance; calculating an upper limit value and a lower limit value of a range of the flash ratio, based on a selected local flash ratio and the determined preliminary white balance coefficient; altering the flash ratio so that the flash ratio falls within the calculated range; and calculating a final white balance coefficient applied to the flash image, based on the altered flash ratio.

In a further feature of the invention the method selects the flash ratio with respect to a partial area corresponding to the flash image and the non-flash image, as the local flash ratio wherein the local flash ratio is set as the upper limit value of the calculated flash ratio. The method also derives a value in response to the preliminary white balance coefficient for the flash and the preliminary white balance coefficient for the ambient light and calculates the lower limit value of the flash ratio based on the tentative value. An optimal final WB coefficient value may be calculated by limiting an effective range of a flash ratio value in consideration of image contents.

BRIEF DESCRIPTION OF THE DRAWINGS

The above and/or other aspects of the present invention are made more apparent by describing certain exemplary embodiments of the present invention with reference to the accompanying drawings, in which.

DETAILED DESCRIPTION

Certain exemplary embodiments of the present invention will now be described in greater detail with reference to the accompanying drawings. Throughout the drawings and the following description, elements that appear in more than one drawing or are mentioned in more than one place are consistently denoted by the same reference numerals. Some matters described in detail below, such as detailed constructions and elements, are provided to assist the reader in attaining a comprehensive understanding of the invention. It should be apparent that exemplary embodiments of the present invention can be carried out without such details. For the purposes of clarity and simplicity, well-known functions or constructions are not described in detail to keep the present disclosure clear and concise.

Figure 1:
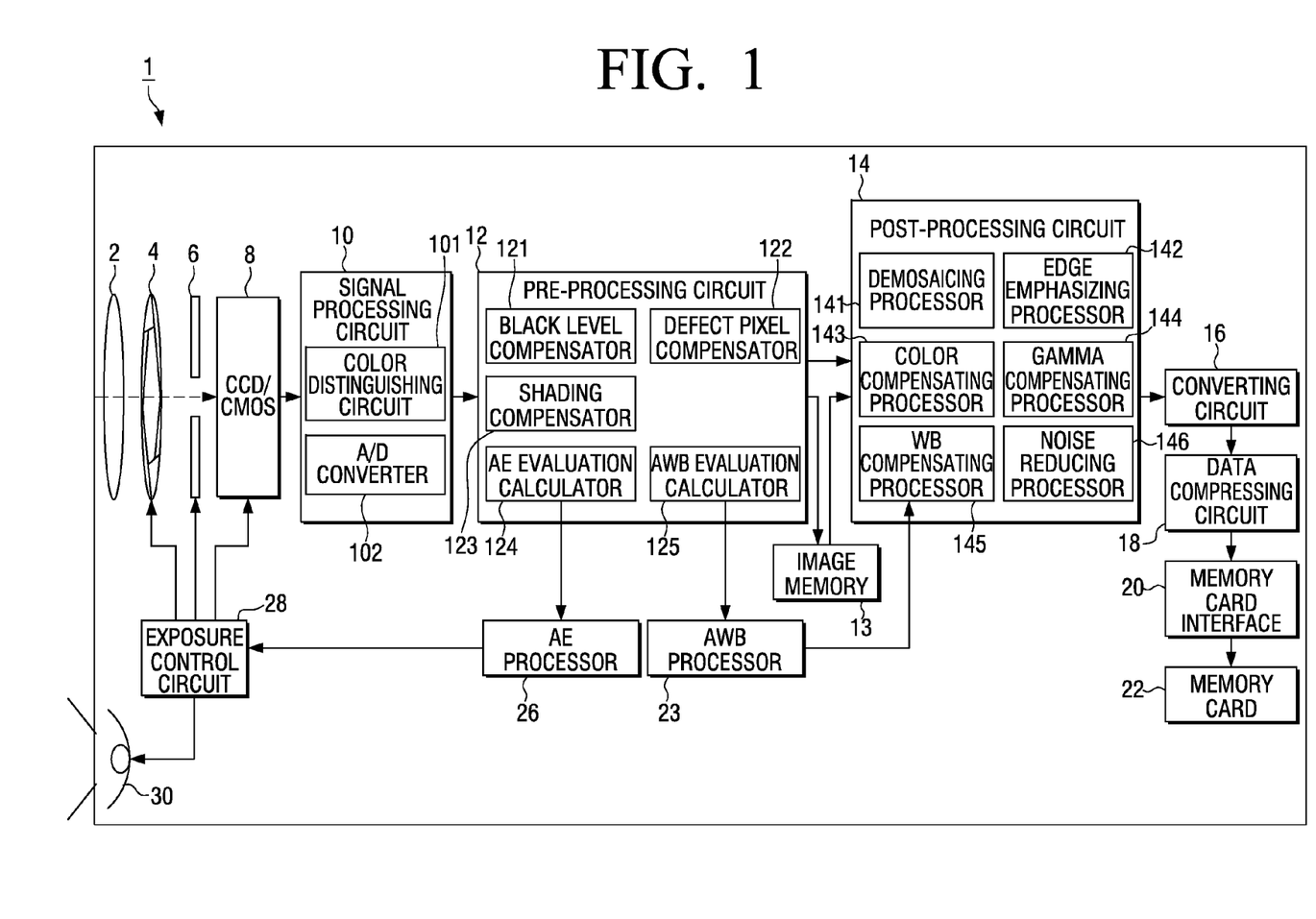
FIG. 1 shows a block diagram illustrating a configuration of an imaging device according to invention principles.

FIG. 1 shows a block diagram illustrating a configuration of imaging device 1, comprising a digital still camera for example, including a lens 2, an aperture 4, a shutter 6, a charge coupled device (CCD)/complementary metal oxide semiconductor (CMOS) 8, a signal processing circuit 10, a pre-processing circuit 12, a post-processing circuit 14, a converting circuit 16, a data compressing circuit 18, a memory card interface 20, a memory card 22, an AWB processor 23, an automatic exposure (AE) processor 26, an exposure control circuit 28 and a flash-emitter 30. Configurations of these are described in detail below.

The lens 2 receives light from a subject. The aperture 4 limits the light entering through the lens 2. The shutter 6 receives light entering through the aperture 4 during an imaging exposure time. The CCD/CMOS 8 is an imaging plate converting a light signal into an electrical signal. That is, the CCD/CMOS 8 receives the light entering through the lens 2, the aperture 4 and the shutter 6 and performs photoelectric conversion of the received light. The CCD/CMOS 8 transmits the electrical signal representing image data obtained by the photoelectric conversion to the signal processing circuit 10. In addition, as used herein, the subject refers to objects including a main subject and a background in a photographed image generated from the photoelectric conversion by the CCD/CMOS 8, and the main subject refers to a man or object targeted by a user as a central imaging object of different subjects. In addition, two images successively acquired in one imaging operation where one image is a flash image acquired using a flash 30 and the other is a non-flash image acquired without the flash 30 are substantially simultaneously acquired with short intervening time difference.

The signal processing circuit 10 includes a color distinguishing circuit 101 and an analog/digital (A/D) converter 102, providing electrical signals of red (R), blue (B) and green (G) pixels and performs A/D conversion. The pre-processing circuit 12 includes a black level compensator 121, a defect pixel compensator 122, a shading compensator 123, an AE evaluation calculator 124 and an AWB evaluation calculator 125. The black level compensator 121 compensates for color or luminance so that the darkest portion (black level) in a pixel is substantially constant. The defect pixel compensator 122 corrects a pixel luminance value for abnormality due to a defect of the CCD/CMOS 8 for example, using a pixel luminance value of a peripheral pixel. The shading compensator 123 compensates an acquired image to provide brightness uniformity over a whole image, to resolve a luminance imbalance. The AE evaluation calculator 124 integrates a luminance value over a predetermined area of the acquired image to calculate an AE evaluation value representing brightness for output to the AE processor 26. The AE processor 26 determines parameters including, shutter speed, the aperture and ISO sensitivity for example, based on the AE evaluation value calculated by the AE evaluation calculator 124, and transmits these parameters to the exposure control circuit 28. The exposure control circuit 28 controls the aperture 4, the shutter 6, the CCD/CMOS 8 and the flash 30 based on the parameters.

The AWB evaluation calculator 125 integrates individual R, G and B signals to calculate an AWB evaluation value, and transmits the calculated AWB evaluation value to the AWB processor 23. Specifically, the AWB evaluation calculator 125 calculates an AWB evaluation value with respect to a non-flash image. The AWB processor 23 determines a preliminary WB coefficient value for performing an AWB process with respect to the acquired image. Specifically, the AWB processor 23 calculates the preliminary WB coefficient value based on the calculated AWB evaluation value with respect to the non-flash image and determines the calculated value as a WB coefficient value for the ambient light. The AWB processor 23 determines a regulation value based on a specification of the imaging device 1 or a real value of the flash as a preliminary WB coefficient value for the flash. This regulation value or real value is pre-stored in the AWB processor 23. The values determined as the preliminary WB coefficient value for the ambient light and the preliminary WB coefficient value for the flash are transmitted to a WB compensating processor 145 in order to calculate a final WB coefficient value. The acquired image data processed by the pre-processing circuit 12 is stored in an image memory 13. In addition, for example, the image memory 13 stores a local image pattern group statistically analyzed for noise reduction processing of the acquired image.

The post-processing circuit 14 receives and processes the acquired image data transmitted from the pre-processing circuit 12 or reads and processes the acquired image data stored in the image memory 13. As shown in FIG. 1, the post-processing circuit 14 includes a demosaicing processor 141, an edge emphasizing processor 142, a color compensating processor 143, a gamma compensating processor 144, the WB compensating processor 145 and a noise reducing processor 146. The demosaicing processor 141 compares each pixel luminance value with a peripheral pixel luminance value from the image data to estimate deficient R, G or B color, and estimates a deficient portion from a color of the peripheral pixel to compensate each pixel. The edge emphasizing processor 142 detects an outline in the acquired image data and increases a color change rate of the outline to form a sharper image. The color compensating processor 143 compensates the color of each pixel in the acquired image. The gamma compensating processor 144 compensates a pixel luminance value of the acquired image data to improve luminance value accuracy for display (not shown) to provide a more accurate image. The WB compensating processor 145 compensates the preliminary WB coefficient value transmitted from the AWB processor 23 to obtain a more accurate value as described in connection with FIGS. 2 to 5. The noise reducing processor 146 decreases image data noise in the acquired image due to heat of the CCD/CMOS 8, for example. The converting circuit 16 receives the acquired image data post-processed by the post-processing circuit 14 and converts the image data from an RGB color space to a YCbCr color space. The image data converted by the converting circuit 16 is compressed by the data compressing circuit 18 and stored in the memory card 22 via memory card interface 20. In addition, each element of the imaging device 1 described above performs its function when a central processing unit (CPU) executes a program stored in a memory such as a flash memory, etc.

Figure 2:
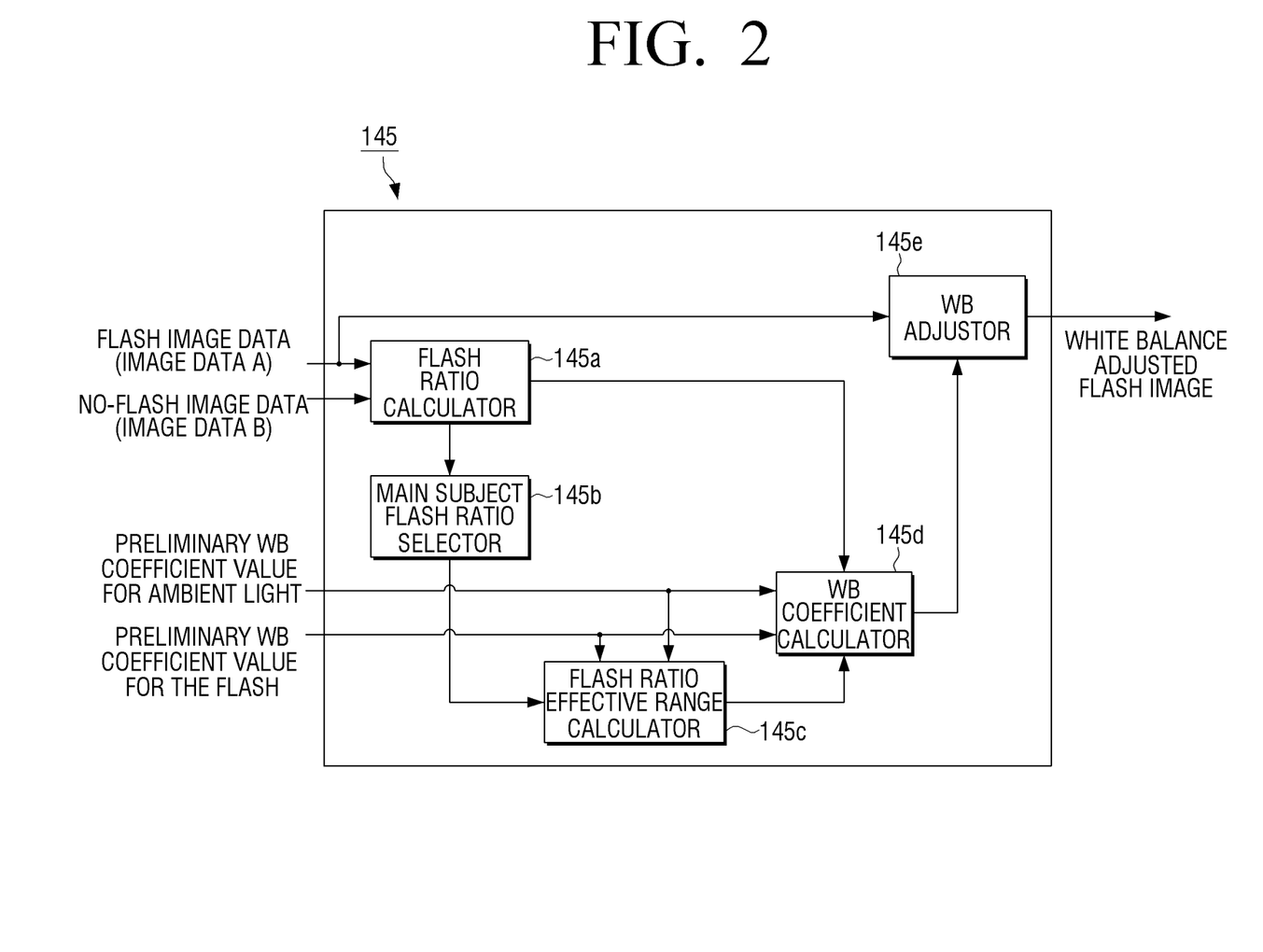
FIG. 2 shows a block diagram illustrating a configuration of a WB compensating processor according to invention principles.

FIG. 2 shows a WB compensating processor 145 including a flash ratio calculator 145a, a main subject flash ratio selector 145b, a flash ratio effective range calculator 145c, a WB coefficient calculator 145d and a WB adjustor 145e. The flash ratio calculator 145a obtains the acquired image data pre-processed by the pre-processing circuit 12. The flash image and the non-flash image are acquired at substantially the same time by the flash ratio calculator 145a as image data A and image data B. The flash ratio calculator 145a compares the image data A with the image data B and calculates the flash ratio representing a contribution of the flash to a pixel luminance value of the flash image. Specifically, the image data A and the image data B are divided into corresponding areas, an average of the pixel luminance value in individual areas is calculated, and the flash ratio is calculated based on a ratio of an average value of the image data A to an average value of the image B. The calculation of the flash ratio in every area is described in detail with reference to Equation 1.

The main subject flash ratio selector 145b is a local flash ratio selector and sets the flash ratio of the main subject in the acquired image using information about an area and specifically, in an embodiment, selects a local flash ratio calculated in response to a ratio of a portion comprising a local flash area of a main subject relative to an overall image area. In addition, the area of the main subject is an area focused on by a user-set subject area automatic focus function for following an area designated by the user with an input part (not shown) such as a touch panel, for example. The area of the main subject is designated by the user selection and thus the flash ratio of the main subject area may be calculated. Specifically, the flash ratio of the main subject is calculated from an average of the pixel luminance value in the main subject area corresponding to the image data A and the image data B, and the calculated value becomes the main subject flash ratio. The calculation of the flash ratio in individual areas is described in detail with reference to Equation 1.

The flash ratio effective range calculator 145c calculates an effective range (upper limit value and lower limit value) of the flash ratio. Specifically, the flash ratio effective range calculator 145c calculates the upper limit value and the lower limit value of the flash ratio based on the preliminary WB coefficient value for the ambient light and the preliminary WB coefficient value for the flash obtained from the AWB processor 23 and the main subject flash ratio selected by the main subject flash ratio selector 145b. A method of calculating the upper limit value and the lower limit value is described in detail below. In addition, ambient light refers to ambient light such as light of lighting equipment and sunlight, excluding the flash, in the environment at the imaging time.

The WB coefficient calculator 145d obtains the ambient light preliminary WB coefficient value for the non-flash image and the flash preliminary WB coefficient value from the AWB processor 23. In addition, the WB coefficient calculator 145d is a flash ratio re-setter and a final white balance coefficient calculator, obtains the flash ratio from the flash ratio calculator 145a and obtains the upper limit value and the lower limit value of the flash ratio from the flash ratio effective range calculator 145c. The WB coefficient calculator 145d calculates a final WB coefficient value (final WB coefficient value) based on these obtained values in order to optimally adjust a white balance of the flash image. A detailed description is given with reference to FIGS. 3 to 5. The WB adjustor 145e multiplies the obtained final WB coefficient value and the pixel luminance value of each pixel in the flash image to adjust the white balance of the flash image.

Figure 3:
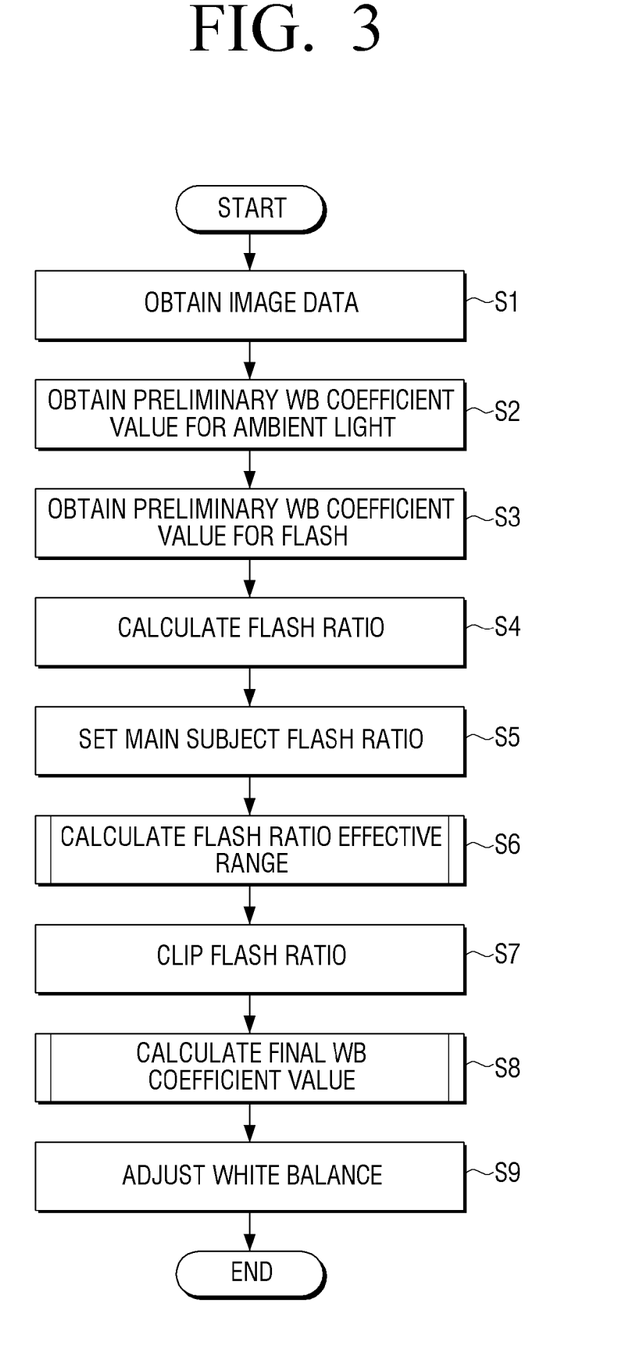
FIG. 3 shows a flowchart of a method for WB compensation according to invention principles.
Figure 4:
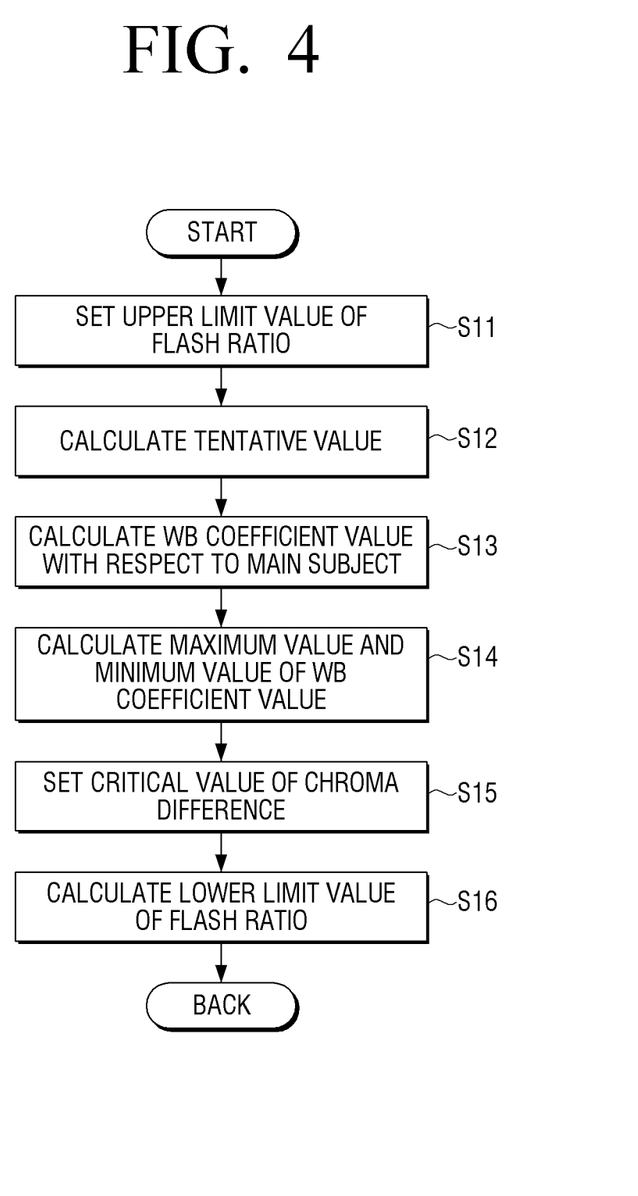
FIG. 4 shows a flowchart of a method for obtaining an upper limit and a lower limit of a flash ratio by the WB compensating processor according to invention principles.
Figure 5:
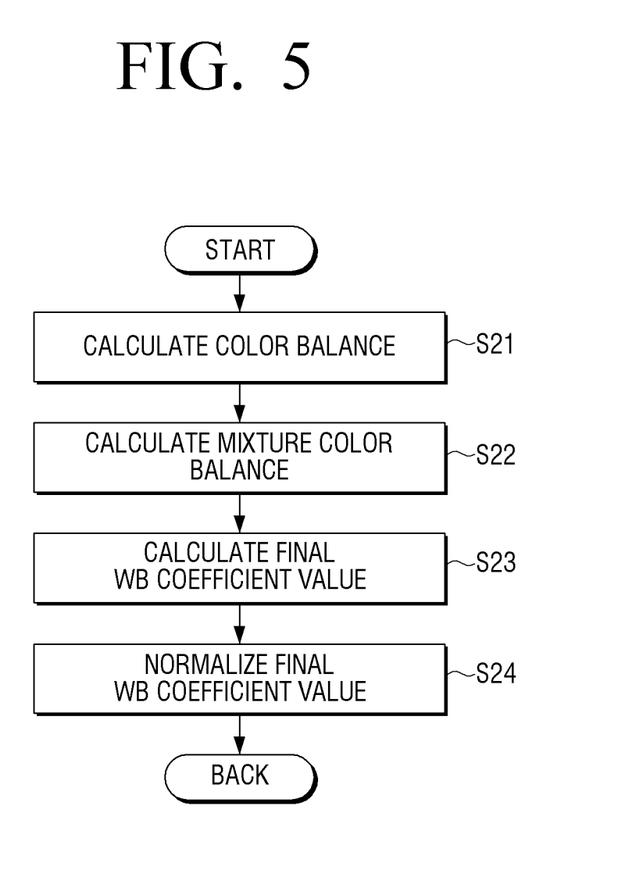
FIG. 5 shows a flowchart of a method for calculating a final WB coefficient value according to invention principles.

FIG. 3 shows a flowchart of a method used by the WB compensating processor, FIG. 4 shows a flowchart of a processing method for obtaining the upper limit and the lower limit of the flash ratio used by the WB compensating processor, and FIG. 5 shows a flowchart of a processing method for calculating the final WB coefficient value used by the WB compensating processor. The processes of FIGS. 3 to 5 may be performed in imaging operations using the flash 30. Hereinafter, the final WB coefficient value is simply called a final WB coefficient value.

As shown in FIG. 3, first, the flash ratio calculator 145a obtains the image data A (step S1) of the flash image acquired using the flash 30 and the image data (image data B) of the non-flash image acquired without the flash 30. The WB coefficient calculator 145d calculates the preliminary WB coefficient value for the ambient light (step S2) for the non-flash image as the preliminary WB coefficient value for the ambient light. The calculation of the preliminary WB coefficient value with respect to the non-flash image is based on a known method, and thus its description is omitted. The WB coefficient calculator 145d obtains the preliminary WB coefficient value for the flash image (step S3). The flash ratio calculator 145a calculates the flash ratio (step S4) based on the flash image and the non-flash image obtained in step S1. Specifically, the flash ratio calculator 145a respectively divides the flash image and the non-flash image equally into equal areas and calculates the flash ratio in individual areas. For example, the flash ratio calculator 145a may quadrisect the flash image and the non-flash image into 2×2 areas.

In addition, the flash ratio calculator 145a calculates an average value of the pixel luminance value in a green pixel in individual areas corresponding to the flash image and the non-flash image. The flash ratio (Ratio) is calculated using Equation 1 from a green average pixel luminance value GA calculated from the image data A of the flash image and a green average pixel luminance value GB calculated from the image data B of the non-flash image.

$$\text{Ratio} = 1.0 - \frac{G_B}{G_A} \qquad \text{Equation 1}$$

The flash ratio (Ratio) calculated in the individual areas is output to the main subject flash ratio selector 145b. In addition, relevant flash ratio (Ratio) is reset into a final flash ratio in individual areas later in step S7.

The main subject flash ratio selector 145b sets the flash ratio of the main subject in the acquired image as the main subject flash ratio (step S5). Specifically, the pixel luminance value in the main subject area and Equation 1 are used to calculate the main subject flash ratio. The calculated main subject flash ratio is output to the flash ratio effective range calculator 145c for calculating the effective range of the flash ratio for the flash image later in step S6. The flash ratio effective range calculator 145c calculates the flash ratio effective range (step S6), upper limit value and lower limit value of the flash ratio with respect to the flash image. The upper limit value and the lower limit value of the relevant flash ratio are calculated based on the preliminary WB coefficient value for the ambient light and the preliminary WB coefficient value for the flash respectively obtained in step S2 and step S3 and the main subject flash ratio set in step S5. A detailed description of setting of the effective range of the flash ratio is given with reference to FIG. 4.

The flash ratio effective range calculator 145c clips the flash ratio (step S7) of each of the 2×2 areas calculated by the flash ratio calculator 145a so that the flash ratio falls within the effective range between the upper limit value and the lower limit value of the flash ratio calculated step S6. That is, the flash ratio is reset so that the flash ratio of each area falls between the upper limit value and the lower limit value. For example, when the flash ratio is greater than the upper limit value, the flash ratio is set to the upper limit value, and when the flash ratio is less than the lower limit value, the flash ratio is set to the lower limit value. When the flash ratio is within the effective range, the flash ratio is not changed. The calculated final flash ratio falling in the effective range is output to the WB coefficient calculator 145d for calculating the final WB coefficient value. WB coefficient calculator 145d calculates the final WB coefficient value (step S8) in individual areas based on the preliminary WB coefficient values obtained in step S2 and step S3 and the flash ratio reset in step S7. A detailed description of the calculation of the final WB coefficient value is given with reference to FIG. 5.

The WB adjustor 145e adjusts the white balance with respect to the flash image (step S9). In this step, the WB adjustor 145e multiplies the final WB coefficient value of the individual areas calculated in step S8 and the pixel luminance values in an area corresponding to the flash image to adjust the white balance of the flash image. The resultant adjusted flash image is output from the WB adjustor 145e. This completes processing by the WB compensating processor 145.

The method (step S6) of obtaining the upper limit value and the lower limit value of the flash ratio and the method (step S8) of calculating the final WB coefficient value are described in detail with reference to FIG. 4 and FIG. 5, respectively. As shown in FIG. 4, the flash ratio effective range calculator 145c sets the upper limit value of the flash ratio (step S11) by setting the main subject flash ratio set in step S5 (FIG. 3) as the upper limit value (UU) of the flash ratio. The flash ratio effective range calculator 145c also calculates the lower limit value (LL) of the flash ratio and calculates tentative values r, g and b (step S12). The tentative values r, g and b comprise a ratio of the preliminary WB coefficient value (WBF) for the flash obtained in step S3 to the preliminary WB coefficient value (WBE) for the ambient light obtained in step S2 with respect to each of RGB colors. The tentative values are calculated by the following Equation 2.

$$r = \frac{WBR_F}{WBR_E},$$
$$g = \frac{WBG_F}{WBG_E},$$
$$b = \frac{WBB_F}{WBB_E}$$

Equation 2

Here, WBRF, WBGF and WBBF are preliminary WB coefficient values for the flash of each of the RGB colors, and WBRE, WBGE and WBBE are preliminary WB coefficient value for the ambient light of each of the colors.

The flash ratio effective range calculator 145c calculates (step S13) the WB coefficient value corresponding to flash ratio (that is, the upper limit value (UU) of the flash ratio) of the main subject in order to obtain a proper WB coefficient value with respect to the main subject. Specifically, red and blue WB coefficient values (WBRUU and WBBUU) corresponding to the upper limit value (UU) of the flash ratio are calculated by the following Equation 3.

$$WBR_{UU} = \frac{WBR_F \times WBR_E}{UU \times (WBR_E - WBR_F) + WBR_F}$$
$$WBB_{UU} = \frac{WBB_F \times WBB_E}{UU \times (WBB_E - WBB_F) + WBB_F}$$

Equation 3

In addition, when a white balance is adjusted by the red and the blue based on the green, the green WB coefficient value with respect to the flash image and the non-flash image is compensated in order to satisfy WBGF=WBGE.

The flash ratio effective range calculator 145c calculates (step S14) a maximum value and a minimum value of the WB coefficient value corresponding to the preliminary WB coefficient value for the ambient light, the preliminary WB coefficient value for the flash, and the upper limit value (UU) of the flash ratio, based on relatives sizes of the tentative values r, g and b calculated using Equation 2. That is, the maximum value MAXE and the minimum value MINE among the preliminary WB coefficient values WBRE, WBBE and WBFE for the ambient light, the maximum value MAXF and the minimum value MINF among the preliminary WB coefficient values WBRF, WBBF and WBGF for the flash, the maximum value MAXUU and the minimum value MINUU among WBRUU, WBBUU and WBGUU calculated from Equation 2 are determined from the following Equation 4.

$$\{MAX_F, MAX_E, MAX_{UU}, MIN_F, MIN_E, MIN_{UU}\} =$$

Equation 4

$$\begin{cases} \{WBR_F, WBR_E, WBR_{UU}, WBB_F, WBB_E WBB_{UU}\}(r \geq g \geq b) \\ \{WBR_F, WBR_E, WBR_{UU}, WBG_F, WBG_E, WBG_{UU}\}(r \geq b \geq g) \\ \{WBG_F, WBG_E, WBG_{UU}, WBR_F, WBR_E, WBR_{UU}\}(g \geq b \geq r) \\ \{WBG_F, WBG_E, WBG_{UU}, WBB_F, WBB_E, WBB_{UU}\}(g \geq r \geq b) \\ \{WBB_F, WBB_E, WBB_{UU}, WBR_F, WBR_E, WBR_{UU}\}(b \geq g \geq r) \\ \{WBB_F, WBB_E, WBB_{UU}, WBG_F, WBG_E, WBG_{UU}\}(b \geq r \geq g) \end{cases}$$

The flash ratio effective range calculator 145c sets a critical value of a chroma difference (step S15). In this step, the flash ratio effective range calculator 145c sets a critical value (SLim) of a chroma difference (S) in order to set the lower limit value (LL) with respect to the upper limit value (UU) of the flash ratio. The chroma difference (S) is a value representing irregularity of the WB coefficient value corresponding to the upper limit value and the lower limit value of the flash ratio of the main subject. The irregularity of the relevant WB coefficient value is limited by setting the critical value (SLim) to the chroma difference (S). For example, the critical value (SLim) of the chroma difference is set as value of "0.35" and in advance to be stored in a memory and may be read by the flash ratio effective range calculator 145c. The critical value may be a value set by the user each time.

The chroma difference (S) is a value based on a ratio of the WB coefficient value (WBUU) corresponding to the upper limit value (UU) of the flash ratio of the main subject to the WB coefficient value (WBLL) corresponding to the lower limit value (LL) of the flash ratio. The chroma difference (S) represents irregularity of the WB coefficient value corresponding to the upper limit value and the lower limit value of the flash ratio of the main subject. The detailed definition is given by the following Equations 5 and 6.

$$S = \frac{MAX(r, g, b) - MIN(r, g, b)}{MAX(r, g, b)} \quad \text{Equation 5}$$

$$r = \frac{WBR_{UU}}{WBR_{LL}}, \quad \text{Equation 6}$$
$$g = \frac{WBG_{UU}}{WBG_{LL}},$$
$$b = \frac{WBB_{UU}}{WBB_{LL}}$$

Here MAX(r, g, b) is a maximum value among r, g and b, and MIN(r, g, b) is a minimum value among r, g and b. In addition, in this step, the WB coefficient value (WBLL) corresponding to the lower limit value (LL) of the flash ratio is an unknown number and thus the chroma difference (S) is also an unknown number, but the lower limit value is calculated using the critical value (SLim) of the chroma difference (S) as described below.

The flash ratio effective range calculator 145c calculates the lower limit value of the flash ratio (step S16). In this step, the lower limit value (LL) of the flash ratio is calculated by the following Equation 7 using the maximum value (MAX), the minimum value (MIN) among the WB coefficient values for the flash, the WB coefficient value for the ambient light and the WB coefficient value of the main subject calculated from Equation 4.

$$LL = \frac{\frac{MIN_{UU}}{MIN_E} - (1 - S_{Lim}) \times \frac{MAX_{UU}}{MAX_E}}{(1 - S_{Lim}) \times MAX_{UU} \times (1/MAX_F - 1/MAX_E) - MIN_{UU} \times (1/MIN_F - 1/MIN_E)} \quad \text{Equation 7}$$

In this way, in the present exemplary embodiment, the WB coefficient value corresponding to the upper limit value (UU) (that is, the flash ratio of the main subject) of the flash ratio is calculated.

In addition, the lower limit value (LL) of the flash ratio is calculated using the critical value of the chroma difference limiting irregularity of the flash ratio and the preliminary WB coefficient value including the relevant WB coefficient value. Further, the effective range of the flash ratio is calculated based on the flash ratio of the main subject so the flash ratio based on the main subject may be reset. The process proceeds to step S7 (FIG. 3) after step S16 (FIG. 4) and the final WB coefficient value of step S8 FIG. 3 is performed.

The WB coefficient calculator 145d calculates a color balance value (step S21 FIG. 5) by calculating a reciprocal number of the preliminary WB coefficient values for the ambient light and the flash respectively determined in step S2 and step S3. By doing this, a preliminary color balance value (CBF) of a light source color of the flash and a preliminary color balance value (CBE) of the ambient light are calculated with respect to each RGB color.

The WB coefficient calculator 145d calculates (step S22) a mixture color balance value (CBMix) based on the final flash ratio (Ratio') obtained in step S7, and the preliminary color balance values (CBF) and (CBE) calculated in step S21. Specifically, the WB coefficient calculator 145d calculates the mixture color balance value (CBMix) in response to a color balance of the ambient light and the flash by the following Equations 8 with respect to each RGB color.

$$CBR_{Mix}(i,j) = (Ratio'(i,j) \times CBR_F) + ((1 - Ratio'(i,j)) \times CBR_E)$$

$$CBG_{Mix}(i,j) = (Ratio'(i,j) \times CBG_F) + ((1 - Ratio'(i,j)) \times CBG_E)$$

$$CBB_{Mix}(i,j) = (Ratio'(i,j) \times CBB_F) + ((1 - Ratio'(i,j)) \times CBB_E) \quad \text{Equation 8}$$

where, i and j are variables of natural numbers for designating an area in the acquired image.

The WB coefficient calculator 145d calculates (step S23) the final WB coefficient value of each area by calculating a reciprocal number of the mixture color balance value (CBMix) of each color calculated in step S22. Specifically, the final WB coefficient value (WBMix) is calculated by the following Equation 9.

$$WBR_{Mix}(i,j) = 1/CBR_{Mix}(i,j)$$

$$WBG_{Mix}(i,j) = 1/CBG_{Mix}(i,j)$$

$$WBB_{Mix}(i,j) = 1/CBB_{Mix}(i,j) \quad \text{Equation 9}$$

The WB coefficient calculator 145d normalizes (step S24) the final WB coefficient value so that a minimum value of the WB coefficient value related to the areas and colors calculated in step S23 becomes 1.0. The normalized WB coefficient value is output to the WB coefficient compensator 145e and the process continues with step S9 (FIG. 3). The effective range of the flash ratio value is set in response to the local flash ratio calculated by the main subject area (a portion area of an overall image). Thus, even though an erroneous flash ratio is obtained due to hand vibration or change in ambient lighting, for example, the flash ratio is clipped so that the flash ratio falls within a normal numerical value range. The final WB coefficient value becomes a proper value and a pixel position disturbance (out of color registration) is reduced using the flash ratio. Specifically, because the upper limit value and the lower limit value of the flash ratio is set based on the main subject, the final WB coefficient value is calculated without flash ratio associated degradation and optimal white balance adjustment of the main subject is provided. As a result, a satisfactory image is obtained, the white balance adjustment of the main subject and remaining image areas is optimized.

While an exemplary embodiment of the present invention is described above, many modifications to the described exemplary embodiment are possible without departing from the scope and technical spirit of the invention as defined by the appended claims. For example, it was described that the flash ratio is calculated in areas resulting from division into 2×2 areas, but the invention is not limited thereto. The divided area may be a random area or provided by a color filter array (CFA) unit. In addition, in step S12, as the WB coefficient value (WBUU) corresponding to the upper limit value (UU) of the flash ratio is calculated while the lower limit value (LL) of the flash ratio is calculated, the WB coefficient value (WBL) corresponding to the relevant lower limit value (LL) may be also calculated. Specifically, the WB coefficient value (WBLL) corresponding to the lower limit value may be additionally calculated by substituting the calculated lower limit value for UU on the right side of Equation 2. Because of this, the chroma difference (S) for checking is calculated using Equation 5 and Equation 6. In addition, the preliminary coefficient value of each RGB color or the final WB coefficient value may be set. For example, it is also preferable that in the flash image and the non-flash image, the green WB coefficient value WBG is fixed to 1.0 and R and B are changed in order to adjust the white balance.

The above-described embodiments can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. The functions and process steps herein may be performed automatically or wholly or partially in response to user command. An activity (including a step) performed automatically is performed in response to executable instruction or device operation without user direct initiation of the activity. No claim element herein is to be construed under the provisions of 35 U.S.C. 112, sixth paragraph, unless the element is expressly recited using the phrase "means for."

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An imaging device comprising:
   an acquisition unit configured to acquire,
     a flash image obtained using a flash and
     a non-flash image obtained under ambient lighting without the flash;
   a flash contribution calculator configured to calculate a flash contribution indicator representing a contribution of the flash to an individual pixel luminance value of the flash image, based on the flash image and the non-flash image acquired by the acquisition unit;
   a preliminary white balance coefficient determination unit configured to determine a preliminary white balance coefficient for the flash and ambient light in order to adjust a white balance;
   a flash contribution indicator range calculator configured to calculate an upper limit value and a lower limit value of a range of the flash contribution indicator, based on a local flash contribution indicator and the determined preliminary white balance coefficient;
   a flash contribution indicator processor configured to alter a flash contribution indicator value calculated by the flash contribution indicator calculator, so that the flash contribution indicator falls within the calculated range; and
   a white balance coefficient calculator configured to calculate a white balance coefficient for application to the flash image, based on the altered flash contribution indicator.

2. The imaging device as claimed in claim 1, including a local flash contribution selector configured to select the local flash contribution indicator associated with a partial area of the flash image and the non-flash image, as a local flash contribution indicator; wherein the flash contribution indicator range calculator is configured to set the local flash contribution indicator as the upper limit value.

3. The imaging device as claimed in claim 1, wherein the flash contribution indicator comprises a flash ratio and the flash contribution indicator range calculator is configured to calculate the lower limit value of the flash contribution indicator, based on a value derived in response to the preliminary white balance coefficient for the flash and the preliminary white balance coefficient for the ambient light.

4. The imaging device as claimed in claim 1, including a local flash contribution selector configured to select the local flash contribution indicator associated with a partial area of the flash image and the non-flash image, as a local flash contribution indicator.

5. An imaging method comprising:
   (a) acquiring a flash image using a flash and a non-flash image under ambient lighting without the flash;
   (b) calculating a flash ratio representing a contribution of the flash to a pixel luminance value of the flash image, based on the acquired flash image and non-flash image;
   (c) determining a preliminary white balance coefficient for the flash and ambient light in order to adjust a white balance;
   (d) calculating an upper limit value and a lower limit value of a range of the flash ratio, based on a selected local flash ratio and the determined preliminary white balance coefficient;
   (e) altering the flash ratio so that the flash ratio falls within the calculated range; and
   (f) calculating a final white balance coefficient applied to the flash image, based on the altered flash ratio.

6. The imaging method as claimed in claim 5, including selecting the flash ratio with respect to a partial area corresponding to the flash image and the non-flash image, as the local flash ratio wherein the local flash ratio is set as the upper limit value of the calculated flash ratio.

7. The imaging method as claimed in claim 5, further comprising:
   deriving a value in response to the preliminary white balance coefficient for the flash and the preliminary white balance coefficient for the ambient light; and calculating the lower limit value of the flash ratio based on the tentative value.

8. The imaging method as claimed in claim 5, further comprising: selecting the flash contribution indicator associated with a partial area of the flash image and the non-flash image, as a local flash contribution indicator.

9. A non-transitory computer-readable recording medium having recorded thereon a program which, when executed by a computer, causes the computer to perform an imaging method, the method comprising:
- acquiring a flash image using a flash and a non-flash image under ambient lighting without the flash;
- calculating a flash contribution indicator representing a contribution of the flash to an individual pixel luminance value of the flash image, based on the acquired flash image and non-flash image;
- determining a preliminary white balance coefficient for the flash and ambient light in order to adjust a white balance;
- calculating an upper limit value and a lower limit value of a range of the flash contribution indicator, based on a selected local flash contribution indicator and the determined preliminary white balance coefficient;
- altering the flash contribution indicator so that the flash contribution indicator falls within the calculated range; and
- calculating a final white balance coefficient applied to the flash image, based on the altered flash contribution indicator.

10. The non-transitory computer-readable recording medium as claimed in claim 9, wherein the local flash contribution indicator is set as the upper limit value of the calculated flash contribution indicator.

11. The non-transitory computer-readable recording medium as claimed in claim 9, the method executed by the program code wherein the flash contribution indicator comprises a flash ratio.

12. The non-transitory computer-readable recording medium as claimed in claim 9, the method executed by the program code further comprising: selecting the flash contribution indicator associated with a partial area of the flash image and the non-flash image, as a local flash contribution indicator.

13. The non-transitory computer-readable recording medium as claimed in claim 9, the method executed by the program code further comprising:
- deriving a value in response to the preliminary white balance coefficient for the flash and the preliminary white balance coefficient for the ambient light; and
- calculating the lower limit value of the flash contribution indicator based on the tentative value.

14. The non-transitory temporary computer-readable recording medium as claimed in claim 13, the method executed by the program code wherein the step of deriving the value comprises dividing the preliminary white balance coefficient for the flash by the preliminary white balance coefficient for the ambient light.

* * * * *